US011325342B2

(12) United States Patent
Okamura et al.

(10) Patent No.: US 11,325,342 B2
(45) Date of Patent: May 10, 2022

(54) ADHESIVE TAPE

(71) Applicant: ENEOS Corporation, Tokyo (JP)

(72) Inventors: Tomoyuki Okamura, Tokyo (JP);
Liang Huang, Chiba (JP); Masahiro Wakayama, Chiba (JP)

(73) Assignee: Eneos Corporation (JP)

( * ) Notice: Subject to any disclaimer, the term of this patent is extended or adjusted under 35 U.S.C. 154(b) by 300 days.

(21) Appl. No.: 16/473,453

(22) PCT Filed: Dec. 19, 2017

(86) PCT No.: PCT/JP2017/045543
§ 371 (c)(1),
(2) Date: Jun. 25, 2019

(87) PCT Pub. No.: WO2018/123733
PCT Pub. Date: Jul. 5, 2018

(65) Prior Publication Data
US 2019/0329522 A1   Oct. 31, 2019

(30) Foreign Application Priority Data

Dec. 27, 2016 (JP) .............................. JP2016-253787

(51) Int. Cl.
*B32B 5/12* (2006.01)
*C09J 7/24* (2018.01)
(Continued)

(52) U.S. Cl.
CPC ................ *B32B 5/12* (2013.01); *B32B 3/266* (2013.01); *B32B 5/02* (2013.01); *B32B 5/024* (2013.01);
(Continued)

(58) Field of Classification Search
CPC ........... B32B 5/12; B32B 3/266; B32B 5/028; B32B 5/02; B32B 2307/732;
(Continued)

(56) References Cited

U.S. PATENT DOCUMENTS 4,530,319 A   7/1985 Honda
4,530,914 A   7/1985 Ewen et al.
(Continued)

FOREIGN PATENT DOCUMENTS

CA   1231701 A   1/1988
CA   1231702 A   1/1988
(Continued)

OTHER PUBLICATIONS

Dhinese Search Report for Application No. 2011800191635, dated Mar. 23, 2021, 10 pages.
(Continued)

*Primary Examiner* — Jasper Saberi
(74) *Attorney, Agent, or Firm* — Lerner, David, Littenberg, Krumholz & Mentlik, LLP

(57) ABSTRACT

A substrate 2 of an adhesive tape 1 includes a mesh structure made of thermoplastic resin. The mesh structure has a structure in which multiple first fibers drawn in a first direction corresponding to a length direction of the adhesive tape and multiple second fibers drawn in a second direction corresponding to a width direction of the adhesive tape are layered or woven. (a) A first fiber has a thickness of 0.04 mm or less, and a width of 0.6 mm or less, (b) a second fiber has a thickness greater than that of the first fiber, and a width greater than or equal to that of the first fiber, (c) the mesh structure has a tensile strength in the first direction of from 130 to 250 N/50 mm, (d) the mesh structure has a bending resistance in the first direction obtained by a cantilever test of from 40 to 80 mm, and (e) the mesh structure has a
(Continued)

bending resistance in the second direction obtained by the cantilever test of from 65 to 95 mm.

7 Claims, 5 Drawing Sheets

(51) Int. Cl.
    *B32B 7/02*     (2019.01)
    *B32B 5/08*     (2006.01)
    *C09J 7/22*     (2018.01)
    *B32B 5/02*     (2006.01)
    *B32B 27/12*     (2006.01)
    *B32B 27/32*     (2006.01)
    *C09J 7/21*     (2018.01)
    *B32B 7/022*     (2019.01)
    *B32B 3/26*     (2006.01)
    *C09J 7/29*     (2018.01)

(52) U.S. Cl.
    CPC ............... *B32B 5/028* (2013.01); *B32B 5/08* (2013.01); *B32B 7/02* (2013.01); *B32B 7/022* (2019.01); *B32B 27/12* (2013.01); *B32B 27/32* (2013.01); *C09J 7/21* (2018.01); *C09J 7/22* (2018.01); *C09J 7/243* (2018.01); *C09J 7/29* (2018.01); *B32B 2262/0253* (2013.01); *B32B 2307/54* (2013.01); *B32B 2307/546* (2013.01); *B32B 2307/732* (2013.01); *B32B 2323/046* (2013.01); *B32B 2405/00* (2013.01); *C09J 2423/046* (2013.01)

(58) Field of Classification Search
    CPC ...... B32B 2307/546; B32B 2262/0253; B32B 2405/00; B32B 5/26; B32B 2307/58; B32B 2307/516; C09J 7/21; C09J 7/243; C09J 7/22; C09J 7/26; C09J 7/29; C09J 2400/263
    See application file for complete search history.

(56) References Cited

U.S. PATENT DOCUMENTS

| | | | |
|---|---|---|---|
| 4,540,753 | A | 9/1985 | Cozewith et al. |
| 4,542,199 | A | 9/1985 | Kaminsky et al. |
| 4,544,762 | A | 10/1985 | Kaminsky et al. |
| 4,796,510 | A | 1/1989 | Piesik |
| 4,935,474 | A | 6/1990 | Ewen et al. |
| 5,278,272 | A * | 1/1994 | Lai ............ B32B 27/08 526/348.5 |
| 5,861,202 | A * | 1/1999 | Kimura ............ B32B 5/022 428/105 |
| 6,063,492 | A * | 5/2000 | Kurihara ............ D04H 3/04 428/343 |
| 2002/0128403 | A1 | 9/2002 | Stevens et al. |
| 2008/0306218 | A1 | 12/2008 | Madle et al. |
| 2015/0004860 | A1 | 1/2015 | Harashige et al. |
| 2016/0229152 | A1 | 8/2016 | Suzuki et al. |

FOREIGN PATENT DOCUMENTS

| | | |
|---|---|---|
| CA | 1260490 A | 9/1989 |
| CN | 103857525 A | 6/2014 |
| CN | 105682915 A | 6/2016 |
| EP | 0821044 A2 | 1/1998 |
| JP | S5819309 A | 2/1983 |
| JP | S59023011 A | 2/1984 |
| JP | S5995292 A | 6/1984 |
| JP | S6035006 A | 2/1985 |
| JP | S6035007 A | 2/1985 |
| JP | S6035008 A | 2/1985 |
| JP | S6035009 A | 2/1985 |
| JP | S61130314 A | 6/1986 |
| JP | H01204983 A | 8/1989 |
| JP | H03163088 A | 7/1991 |
| JP | H04323286 A | 11/1992 |
| JP | H08169076 A | 7/1996 |
| JP | H08281888 A | 10/1996 |
| JP | H1036795 A | 2/1998 |
| JP | 2003193005 A | 7/2003 |
| JP | 2006028726 A | 2/2006 |
| JP | 2006188713 A | 7/2006 |
| JP | 2009001776 A | 1/2009 |
| JP | 2015113539 A | 6/2015 |
| WO | 2015056618 A1 | 4/2015 |

OTHER PUBLICATIONS

Chinese Office Action including Search Report for Application No. 2011800191635, dated Mar. 23, 2021, 10 pages.
International Search Report for PCT/JP2017/045543 dated Feb. 13, 2018.
International Preliminary Report on Patentability for Application No. PCT/JP2017/045543 dated Jul. 11, 2019, pp. 1-6.
Chinese Office Action including Search Report for Application No. 201780079163.5, dated Mar. 23, 2021, 10 pages.
Chinese Office Action including Search Report for Application No. 201780079163.5 dated Oct. 19, 2021, 10 pages.

* cited by examiner

FIG.6

| Characteristics | | Unit | Example 1 | Example 2 | Example 3 | Example 4 |
|---|---|---|---|---|---|---|
| First fiber | Width (a) | mm | 0.42 | 0.55 | 0.21 | 0.55 |
| | Thickness | mm | 0.035 | 0.025 | 0.035 | 0.032 |
| | Single fiber strength | N/fiber | 3.4 | 4.1 | 1.9 | 4.1 |
| Second fiber | Width (b) | mm | 0.71 | 0.91 | 0.71 | 1.81 |
| | Thickness | mm | 0.045 | 0.061 | 0.045 | 0.039 |
| b / a | | | 1.69 | 1.65 | 3.4 | 3.3 |
| Adhesive force | | N | 55 | 40 | 45 | 45 |
| Adhesive layer | | | Metallocene LLDPE | | | |
| Tensile strength | First direction | N/50mm | 140 | 170 | 160 | 180 |
| Bending resistance | First direction (c) | mm | 60 | 50 | 60 | 60 |
| | Second direction (d) | mm | 83 | 87 | 80 | 70 |
| d / c | | | 1.38 | 1.74 | 1.3 | 1.2 |
| Extruded laminate | Thickness | μm | 30/30 | 30/30 | 30/25 | 40/20 |
| | Formability | | ○ | ○ | ○ | ○ |
| | Wrinkling | | not observed | not observed | not observed | not observed |
| Misalignment of fibers | | | not observed | not observed | not observed | not observed |
| Ease of cutting | | | ◎ | ◎ | ◎ | ◎ |
| Workability during placing process | | | ○ | ○ | ○ | ○ |
| Workability during peeling off process | | | ◎ | ○ | ○ | ○ |

FIG.7

| Characteristics | | Unit | Comparative Example 1 | Comparative Example 2 | Comparative Example 3 | Comparative Example 4 | Comparative Example 5 |
|---|---|---|---|---|---|---|---|
| First fiber | Width (a) | mm | 0.42 | 0.907 | 0.907 | 0.7 | 0.45 |
| | Thickness | mm | 0.035 | 0.035 | 0.035 | 0.035 | 0.019 |
| | Single fiber strength | N/fiber | 3.3 | 7.3 | 7.3 | 5.6 | 4.8 |
| Second fiber | Width (b) | mm | 0.71 | 0.57 | 0.57 | 0.91 | 1.04 |
| | Thickness | mm | 0.045 | 0.045 | 0.045 | 0.049 | 0.042 |
| b / a | | | 1.69 | 0.63 | 0.63 | 1.3 | 2.3 |
| Adhesive force | | N | 30 | 30 | 50 | 40 | |
| Adhesive layer | | | L D P E | L D P E | Metallocene LLDPE | | |
| Tensile strength | First direction | N/50mm | 140 | 190 | 190 | 170 | 220 |
| Bending resistance | First direction (c) | mm | 60 | 80 | 80 | 60 | 40 |
| | Second direction (d) | mm | 80 | 60 | 60 | 80 | 62 |
| d / c | | | 1.33 | 0.75 | 0.75 | 1.33 | 1.55 |
| Extruded laminate | Thickness | μm | 30/30 | 30/30 | 30/30 | 30/30 | 22/22 |
| | Formability | | ○ | ○ | ○ | ○ | ×～△ |
| | Wrinkling | | not observed | not observed | not observed | not observed | observed |
| Misalignment of fibers | | | not observed | not observed | not observed | not observed | observed |
| Ease of cutting | | | ○ | × | × | △ | ◎ |
| Workability during placing process | | | ○ | ○ | ○ | ○ | ○ |
| Workability during peeling off process | | | × | ○ | ◎ | ○ | ◎ |

ADHESIVE TAPE

CROSS-REFERENCE TO RELATED APPLICATIONS

This application is a national phase entry under 35 U.S.C. § 371 of International Application No. PCT/JP2017/045543, filed on Dec. 19, 2017, published in Japanese, which claims priority to Japanese Patent Application No. 2016-253787, filed on Dec. 27, 2016, the disclosures of which are hereby incorporated herein by reference.

TECHNICAL FIELD

The present invention relates to adhesive tapes, and more specifically, relates to adhesive tapes that are easy to cut so that a user can easily cut the adhesive tapes by hand.

BACKGROUND ART

As an example of a conventional adhesive tape that is easy to cut, an adhesive tape disclosed in Patent Document 1 is known. The adhesive tape disclosed in Patent Document 1 includes: a mesh laminate including first and second mesh films, each of which is prepared by splitting a polyolefin synthetic resin drawn in one direction and by widening the film in a direction orthogonal to the drawing direction, the first and second mesh films being layered and bonded so that their drawing directions are substantially orthogonal to each other; a synthetic resin laterally drawn film that is layered on one side of the mesh laminate; and an adhesive layer layered on the other side of the mesh laminate. The first mesh film is made of a fiber having a tensile strength of not more than 1.2 kg per 1 mm of fiber width, and the second mesh film is made of a fiber having a tensile strength of 1.4 kg or greater per 1 mm of fiber width. The mesh laminate and the synthetic resin laterally drawn film are layered such that the fiber direction of the first mesh film and the drawing direction of the synthetic resin laterally drawn film are substantially orthogonal.

REFERENCE DOCUMENT LIST

Patent Document

Patent Document 1: JP H01-204983 A

SUMMARY OF THE INVENTION

Problem to be Solved by the Invention

The adhesive tape disclosed in Patent Document 1 uses the synthetic resin laterally drawn film and the mesh laminate as the substrate. This increases the cost of the adhesive tape. Furthermore, in Patent Document 1, sufficient consideration has not been given to ease of handling of the adhesive tape at the time of production or use. For example, if the characteristics and the like of the mesh laminate are inappropriate, there is a concern that defects may occur during production of the adhesive tape and productivity may decrease. In addition, there is a concern that there may occur insufficient adhesion when the adhesive tape is applied, or the adhesive tape may be torn, or a residue of the adhesive tape may remain when the adhesive tape is peeled off. This may reduce the workability for the user. Furthermore, from the viewpoint of improvement of workability, further improvement is required for ease of cutting.

Thus, an object of the present invention is to provide an adhesive tape that has superior ease of cutting and is capable of improving its productivity and workability for a user as compared with conventional ones.

Means for Solving the Problem

The inventors of the present invention have found that when a mesh structure satisfying specific conditions is used to form a substrate (support) of an adhesive tape, not only is the cutting made easy, but also ease of handling at the time of manufacturing and ease of use of the adhesive tape are improved, specifically, the productivity of the adhesive tape and the workability for the user, can be achieved. The present invention has been made based on this finding.

That is, an adhesive tape according to the present invention comprises: a substrate including a mesh structure made of thermoplastic resin; and an adhesive layer provided on one side of the substrate. The mesh structure has a structure in which multiple first fibers drawn in a first direction corresponding to a length direction of the adhesive tape and multiple second fibers drawn in a second direction corresponding to a width direction of the adhesive tape are layered or woven, wherein (a) a first fiber has a thickness of 0.04 mm or less, and the first fiber has a width of 0.6 mm or less, (b) a second fiber has a thickness greater than that of the first fiber, and the second fiber has a width greater than or equal to that of the first fiber, (c) the mesh structure has a tensile strength in the first direction of from 130 to 250 N/50 mm, (d) the mesh structure has a bending resistance in the first direction obtained by a cantilever test of from 40 to 80 mm, and (e) the mesh structure has a bending resistance in the second direction obtained by the cantilever test of from 65 to 95 mm.

Effects of the Invention

According to the present invention, it is possible to provide an adhesive tape that is superior in ease of cutting and is capable of improving its productivity and workability for a user as compared with conventional ones.

BRIEF DESCRIPTION OF THE DRAWINGS

FIG. 6 is a table indicating the characteristics of Examples.

FIG. 7 is a table indicating the characteristics of Comparative Examples.

MODE FOR CARRYING OUT THE INVENTION

Figure 1:
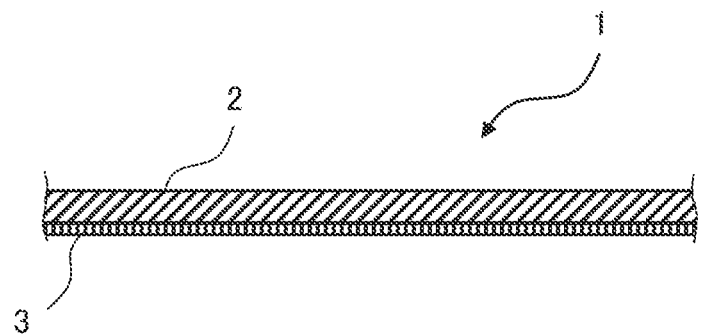
FIG. 1 is a schematic cross-sectional view of an adhesive tape according to an embodiment of the present invention.

Hereinbelow, embodiments of the present invention will be described with reference to the accompanying drawings. FIG. 1 is a schematic cross-sectional view of an adhesive tape 1 according to an embodiment of the present invention.

As illustrated in FIG. 1, the adhesive tape 1 according to the embodiment includes: a substrate 2 including a mesh structure made of thermoplastic resin; and an adhesive layer 3 provided on one side of the substrate 2.

The mesh structure constituting the substrate 2 has a structure in which multiple first fibers drawn in a first direction corresponding to the length direction (longitudinal direction) of the adhesive tape 1 and multiple second fibers drawn in a second direction corresponding to the width direction (lateral direction) of an adhesive tape 1 are layered or woven.

The adhesive layer 3 is formed of a known adhesive, such as an acrylic adhesive. The thickness of the adhesive layer 3 is not particularly limited, but it may be about 10 to 40 μm. In order to stably form the adhesive layer 3, an extruded laminate layer (not illustrated) made of high-pressure low-density polyethylene (LDPE), for example, is formed on at least the one side of the substrate 2 (the mesh structure).

The adhesive tape 1 according to the embodiment is generally cut in the width direction by hand by a user and then is placed on a predetermined adhered portion via the adhesive layer 3. The adhesive tape 1 may be suitably used not only as a packaging tape but also as a curing tape and a masking tape at construction sites, or the like.

According to the present embodiment, the mesh structure constituting the substrate 2 has the following characteristics to enable the adhesive tape 1 to be easily cut in the width direction (ease of cutting, ability to be cut by hand), the adhesive tape 1 to be stably manufactured (productivity), and the adhesive tape 1 to be smoothly used in the placing process and the peeling off process (workability), for example.

Specifically, in the mesh structure, the first fiber has a thickness of 0.04 mm or less, and preferably 0.02 to 0.04 mm. The first fiber has a width of 0.6 mm or less, and preferably 0.2 to 0.6 mm. This is because if the thickness of the first fiber or the width of the first fiber is excessive, there is a concern that ease of cutting may decrease.

The second fiber has a thickness greater than that of the first fiber. Preferably, the second fiber has a thickness greater than that of the first fiber and the thickness is 0.07 mm or less. Furthermore, the second fiber has a width greater than or equal to that of the first fiber. Preferably, the second fiber has a width greater than or equal to that of the first fiber and the width is 2 mm or less. This is because of the following reasons. In order to ensure the ease of cutting, it is preferable that the thickness and the width of the second fiber be greater than those of the first fiber, that is, the mesh structure has a strength to some extent in the first direction corresponding to the length direction, more specifically, the mesh structure is likely to be cut in the second direction corresponding to the width direction while it is harder to cut in the first direction corresponding to the length direction than in the second direction.

The mesh structure has a tensile strength in the first direction (that is, the length direction of the adhesive tape 1) of from 130 to 250 N/50 mm. This is because of the following reasons. If the tensile strength of the mesh structure in the first direction is excessively low, there is a concern that, for example, the adhesive tape 1 will tear when the adhesive tape 1 is peeled off from the adhered portion, resulting in a decrease in workability, and furthermore, there is a concern that when the adhesive tape 1 is used for packaging, and when a package is dropped, then the adhesive tape 1 may be easily broken (unpacked) due to the impact, or the like, so that the adhesive tape 1 may not sufficiently function as a packing tape. On the other hand, if the tensile strength of the mesh structure in the first direction is excessively high, there is a concern that this will result in a decrease in ease of cutting.

Furthermore, the mesh structure has a bending resistance in the first direction obtained by the cantilever test of from 40 to 80 mm, and a bending resistance in the second direction obtained by the cantilever test of from 65 to 95 mm Preferably, the bending resistance in the second direction is greater than that in the first direction. This is because of the following reasons. If the bending resistances of the mesh structure in the first direction and the second direction is excessively small or large, there is a concern that the workability during the placing process of the adhesive tape 1 may decrease, and in particular, if the bending resistance in the second direction is excessively small, there is a concern that wrinkling, twisting, or the like, may occur in the mesh structure while the adhesive tape 1 is manufactured (for example, while the extrusion laminate layer is formed), resulting in a decrease in productivity of the adhesive tape 1. Furthermore, from the viewpoint of ease of cutting, it is preferable that the mesh structure be less likely to be bent in the second direction to some extent. For example, it is preferable that the mesh structure be less likely to be bent in the second direction, which corresponds to the width direction, than in the first direction, which corresponds to the length direction.

Preferably, the first fiber has a single fiber strength of 5 N/fiber or less, and multiple first fibers and multiple second fibers are bonded together by an adhesive force of 40 N or greater. This is because of the following reasons. Since the single fiber strength of the first fiber is 5 N/fiber or less, the first fiber can be easily cut. Since the multiple first fibers and the multiple second fibers are bonded together by an adhesive force of 40 N or greater, the occurrence of a misalignment between the first fibers and the second fibers while the adhesive tape 1 is cut can be reduced, and the occurrence of a residue while the adhesive tape 1 is peeled off can be reduced. Thus, it is possible to improve the ease of cutting and the workability during a peeling off process of the adhesive tape 1.

Here, in order to bond the first fibers and the second fibers stably and firmly, it is preferable that each of the first and second fibers has an adhesive layer made of linear low-density polyethylene (LLDPE). For example, each of the first and second fibers includes a first thermoplastic resin layer made of polyolefin resin, and a second thermoplastic resin layer made of linear low-density polyethylene having a melting point lower than that of the polyolefin resin. The first fibers and the second fibers are bonded together via the second thermoplastic resin layers made of linear low-density polyethylene by thermocompression bonding, or the like, the second thermoplastic resin layers functioning as adhesive layers. That is, the mesh structure has a structure in which the multiple first fibers and the multiple second fibers are layered and bonded. The difference between the melting point of the polyolefin resin and the melting point of the linear low-density polyethylene is 5° C. or greater, and is preferably 10 to 50° C.

The polyolefin resin refers to a resin mainly composed of a polyolefin, such as polyethylene or polypropylene, and a polymer thereof, and may contain another resin or additive as long as the characteristics are not impaired. Likewise, linear low-density polyethylene may contain another resin or additive as long as the characteristics are not impaired. Examples of the additives include antioxidants, weathering agents, lubricants, anti-blocking agents, antistatic agents, anti-fogging agents, non-dripping agents, pigments, fillers, and the like.

It is preferable that the linear low-density polyethylene be prepared by polymerization using a metallocene catalyst. The metallocene catalyst is a kind of so-called single-site catalyst having a relatively single active site, and contains at least a group IV transition metal compound containing a ligand having a cyclopentadienyl skeleton. Typical examples include transition metal metallocene complexes, such as catalysts prepared by reacting a biscyclopentadienyl complex of zirconium or titanium with methylaluminoxane or the like as a co-catalyst. The metallocene catalyst is a homogeneous or heterogeneous catalyst prepared by variously combining various complexes, co-catalysts, carriers, and the like. The metallocene catalyst is exemplified by known catalysts disclosed in JP S58-19309 A, JP S59-95292 A, JP S59-23011 A, JP S60-35006 A, JP S60-35007 A, JP S60-35008 A, JP S60-35009 A, JP S61-130314 A, JP H03-163088 A, and the like.

The linear low-density polyethylene can be prepared by copolymerizing ethylene and an α-olefin in the presence of the metallocene catalyst by a production process such as gas phase polymerization, slurry polymerization, and solution polymerization. For the copolymer, an α-olefin having 4 to 12 carbon atoms is preferably used. Examples of the α-olefin specifically include butene, pentene, hexene, heptene, octene, nonene, and decene.

More specifically, the linear low-density polyethylene may be produced by polymerizing ethylene and an α-olefin in, for example, substantially oxygen-free and water-free conditions in the presence of an inert hydrocarbon solvent selected from aliphatic hydrocarbons such as hexane and heptane, aromatic hydrocarbons such as benzene, toluene, and xylene, and alicyclic hydrocarbons such as cyclohexane and methylcyclohexane. The polymerization temperature may be selected from a range of 0 to 300° C., the polymerization pressure may be selected from a range of atmospheric pressure to about 100 kg/cm$^2$, and the polymerization time may be selected from a range of 1 minute to 10 hours.

The linear low-density polyethylene polymerized using the metallocene catalyst differs from, for example, copolymers prepared by using a Ziegler catalyst or a Philips catalyst in characteristics, and has characteristics of a relatively small molecular weight distribution and almost equal branch densities of molecular chains. For example, the polymerization using a metallocene catalyst into a linear low-density polyethylene is described in detail in JP 2009-1776 A and JP H8-169076 A by the present applicant. One skilled in the art can produce a linear low-density polyethylene in the presence of a metallocene catalyst in accordance with these publications or other related arts. Alternatively, a commercially available linear low-density polyethylene prepared by polymerization using a metallocene catalyst may also be used.

Furthermore, the linear low-density polyethylene is more preferably a long-chain branch type linear low-density polyethylene prepared by polymerization using a metallocene catalyst. A linear low-density polyethylene having long-chain branches with more than 20 carbon atoms has both flexibility and processability. Thus, it is particularly advantageous from the viewpoint of production of the mesh structure. The long-chain branch type linear low-density polyethylene may be appropriately synthesized by one skilled in the art in accordance with a known method, and a commercially available long-chain branch type linear low-density polyethylene may also be used. The introduction method of a long-chain branch is exemplified by a method of directly copolymerizing ethylene and an α-olefin using a metallocene catalyst. Examples of the metallocene catalyst used in this case include a catalyst using a complex having a cross-linked biscyclopentadienyl ligand, a catalyst using a complex having a cross-linked bisindenyl ligand, a catalyst using a constrained geometry catalyst, and a catalyst using a complex having a benzoindenyl ligand. A method using a complex having a cross-linked (cyclopentadienyl)(indenyl) ligand is also preferred for the generation of a long-chain branch. In these methods, the type of complex, the preparation conditions of a catalyst, and the polymerization conditions can be appropriately selected to control the quality and quantity of a long-chain branch.

The linear low-density polyethylene preferably has a melt flow rate of 0.5 to 10 g/10 min, and more preferably has 1 to 5 g/10 min. If the melt flow rate is less than 0.5 g/10 min, the pressure load at the time of molding may become large in some cases. If the melt flow rate is greater than 10 g/10 min, the linear low-density polyethylene may have poor film formation stability and thus is unfavorable in some cases. Furthermore, the density of the linear low-density polyethylene is 0.900 to 0.940 g/cm$^3$, and is preferably 0.910 to 0.930 g/cm$^3$. If the density is out of these ranges, there is a concern that the heat welding between the first and second fibers may be insufficient.

The thickness of the second thermoplastic resin layer made of linear low-density polyethylene is 4 to 10 μm, is preferably 4 to 9 μm, and is more preferably 4 to 7 μm. If the thickness is less than 4 μm, a sufficient adhesive force for this application cannot be obtained. If the thickness is more than 10 μm, there is a concern that the tensile strength may decrease, a resulting structure may become soft, and the rigidity may excessively decrease, and thus, sufficient characteristics required as a tape substrate cannot be obtained.

The second thermoplastic resin layer made of linear low-density polyethylene may be layered on only one side of the first thermoplastic resin layer made of polyolefin resin, and may be layered on both sides of the first thermoplastic resin layer. When the second thermoplastic resin is layered on both sides of the first thermoplastic resin layer, the composition and thickness of second thermoplastic resin on both sides may be the same, and may be different. However, it is preferable to satisfy the abovementioned conditions of thickness and melt flow rate, the abovementioned composition conditions, and the like.

The multiple first fibers constituting the mesh structure (that is, substrate 2) may be multiple fibers constituting a first uniaxially drawn mesh film uniaxially drawn in the first direction (that is, constituent fibers of the first uniaxially drawn mesh film), or may be multiple drawn fibers (drawn fiber groups) drawn in the axial direction and aligned in the first direction. Likewise, the multiple second fibers constituting the mesh structure (substrate 2) may be multiple fibers constituting a second uniaxially drawn mesh film uniaxially drawn in the second direction (that is, constituent fibers of the second uniaxially drawn mesh film), or may be multiple drawn fibers (drawn fiber groups) drawn in the axial direction and aligned in the second direction.

The uniaxially drawn mesh film is a film having a uniaxially drawn mesh structure, and includes: a split film that is prepared in a manner such that a multilayer film uniaxially drawn and then split or fibrillated at multiple places is expanded in a direction orthogonal to the drawing direction (hereinafter, referred to as "split web"); and a mesh film that is prepared by uniaxially drawing a multilayer film having multiple slits (hereinafter, referred to as "slit web"). It is preferable that the multilayer film have a three-layered structure in which the second thermoplastic resin layer (adhesive layer) made of linear low-density polyethylene is layered on both sides of the first thermoplastic resin layer made of polyolefin resin.

Hereinbelow, embodiments of the mesh structure will be described.

First Mesh Structure

Figure 2:
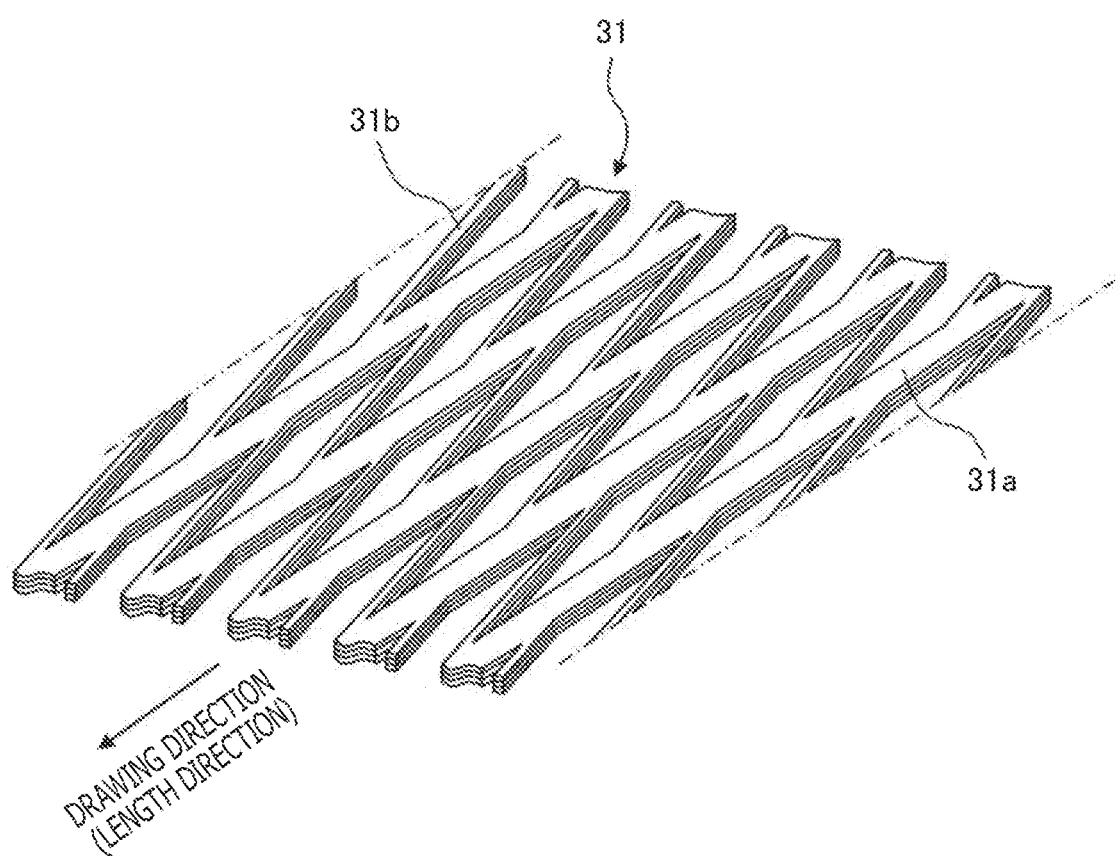
FIG. 2 is a view illustrating an example of a uniaxially drawn mesh film (split web) constituting a substrate (mesh structure) of the adhesive tape.
Figure 3:
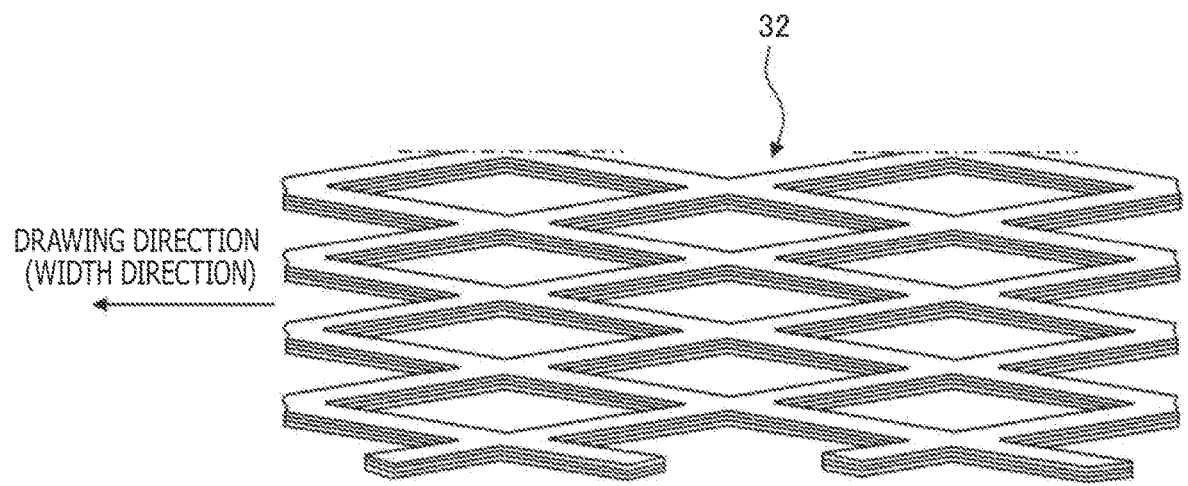
FIG. 3 is a view illustrating another example of the uniaxially drawn mesh film (slit web) constituting the substrate (mesh structure) of the adhesive tape.

The first mesh structure is a complex nonwoven fabric in which the split web as the uniaxially drawn mesh film and the slit web as the uniaxially drawn mesh film are layered and bonded such that their drawing directions are substantially orthogonal to each other. FIG. 2 illustrates the split web, FIG. 3 illustrates the slit web, and FIG. 4 illustrates the first mesh structure.

A split web 31 may be formed by uniaxially drawing a multilayer film in the length direction (longitudinal direction), and by splitting (splitting in a staggered manner, for example) at multiple places along the longitudinal direction, which is the drawing direction, and then by expanding (widening) in the lateral direction (width direction), which is orthogonal to the drawing direction. Here, as described above, the multilayer film has a three-layered structure in which the second thermoplastic resin layer made of linear low-density polyethylene is layered on both sides of the first thermoplastic resin made of polyolefin resin. As illustrated in FIG. 2, the split web 31 has a mesh-like structure, and includes multiple stem fibers 31a extending in the drawing direction and being substantially parallel to each other, the stem fibers 31a serving as the constituent fibers of the mesh-like structure, and branch fibers 31b that connects adjacent stem fibers 31a. By uniaxially drawing the multilayer film, molecules constituting the multilayer film are oriented in the drawing direction. As a result, the split web 31 has relatively high strength in the length direction (longitudinal direction), which corresponds to the drawing direction (alignment direction of constituent molecules).

The slit web 32 may be formed by forming multiple slits extending in the width direction (lateral direction) in the multilayer film (for example, forming the slits in a staggered manner), and then, by drawing the multilayer film in the width direction (lateral direction). As described above, the multilayer film has a three-layered structure in which the second thermoplastic resin layer made of linear low-density polyethylene is layered on both sides of the first thermoplastic resin made of polyolefin resin. As illustrated in FIG. 3, the slit web 32 has a rhomboid mesh-like structure. By uniaxially drawing the multilayer film, molecules constituting the multilayer film are oriented in the drawing direction. As a result, the slit web 32 has relatively high strength in the width direction (lateral direction), which is the drawing direction (orientation direction of constituent molecules).

Figure 4:
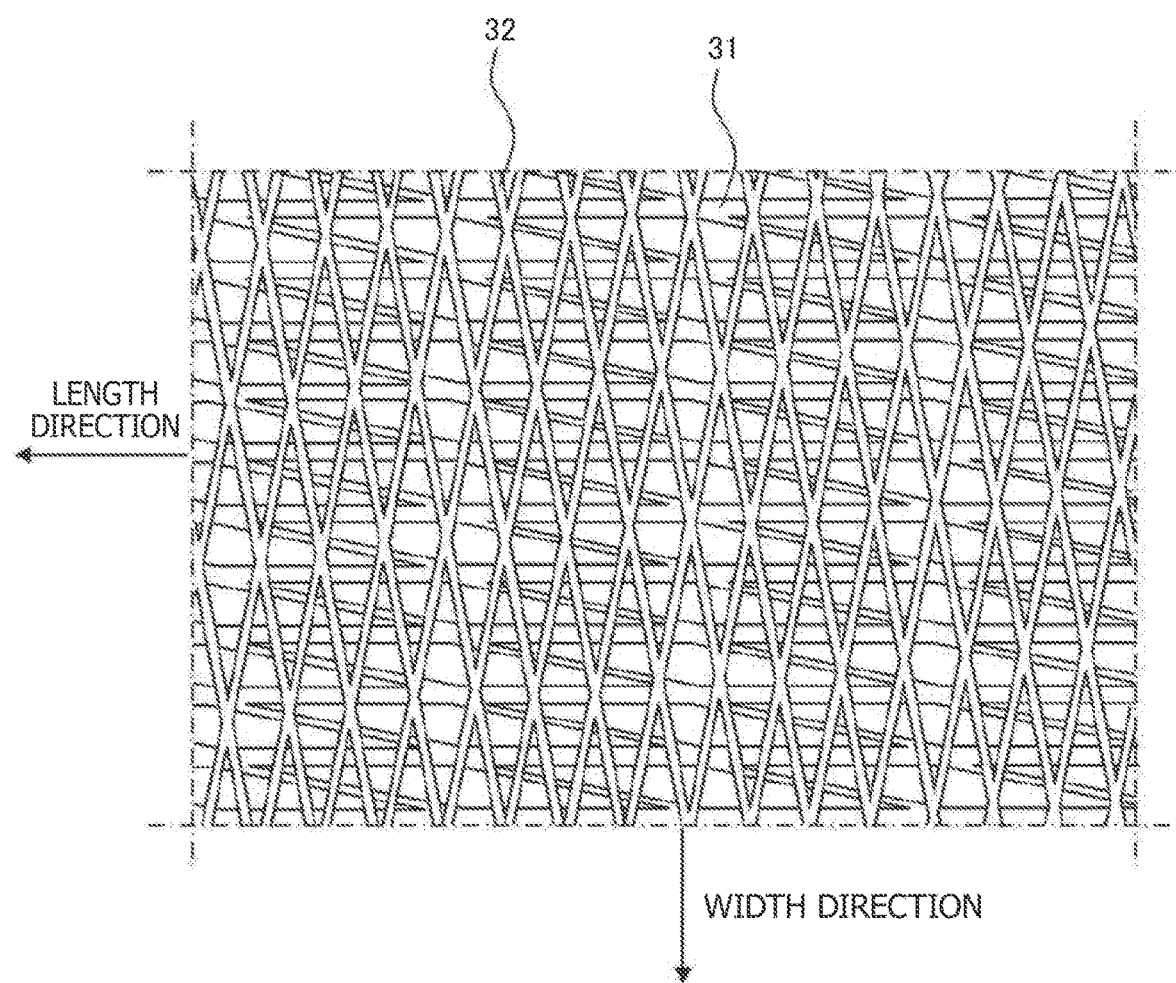
FIG. 4 is a view illustrating an example of the substrate (mesh structure) of the adhesive tape.

As illustrated in FIG. 4, the first mesh structure is formed by layering the split web 31 (FIG. 2) and the slit web 32 (FIG. 3) such that their drawing directions are substantially orthogonal to each other, and then, by bonding them together by thermocompression bonding. That is, the first mesh structure is a complex nonwoven fabric in which the split web 31 (FIG. 2) and the slit web (FIG. 3) are layered and bonded such that their drawing directions are substantially orthogonal to each other. Various characteristics such as a grammage (weight per unit area), sizes (thickness and width) of constituent fibers, tensile strength, and the like, of the first mesh structure can be controlled by appropriately adjusting the thickness of the first thermoplastic resin layer of the multilayer film, the drawing magnification, the splitting portions in the split film 31, the slit forming portions in the slit film 32, and the like. In the first mesh structure, the fiber group constituting the split web 31, or mainly the group of the stem fibers 31a, corresponds to the multiple first fibers, and the fiber group constituting the slit web 32 corresponds to the multiple second fiber.

Second Mesh Structure

Figure 5:
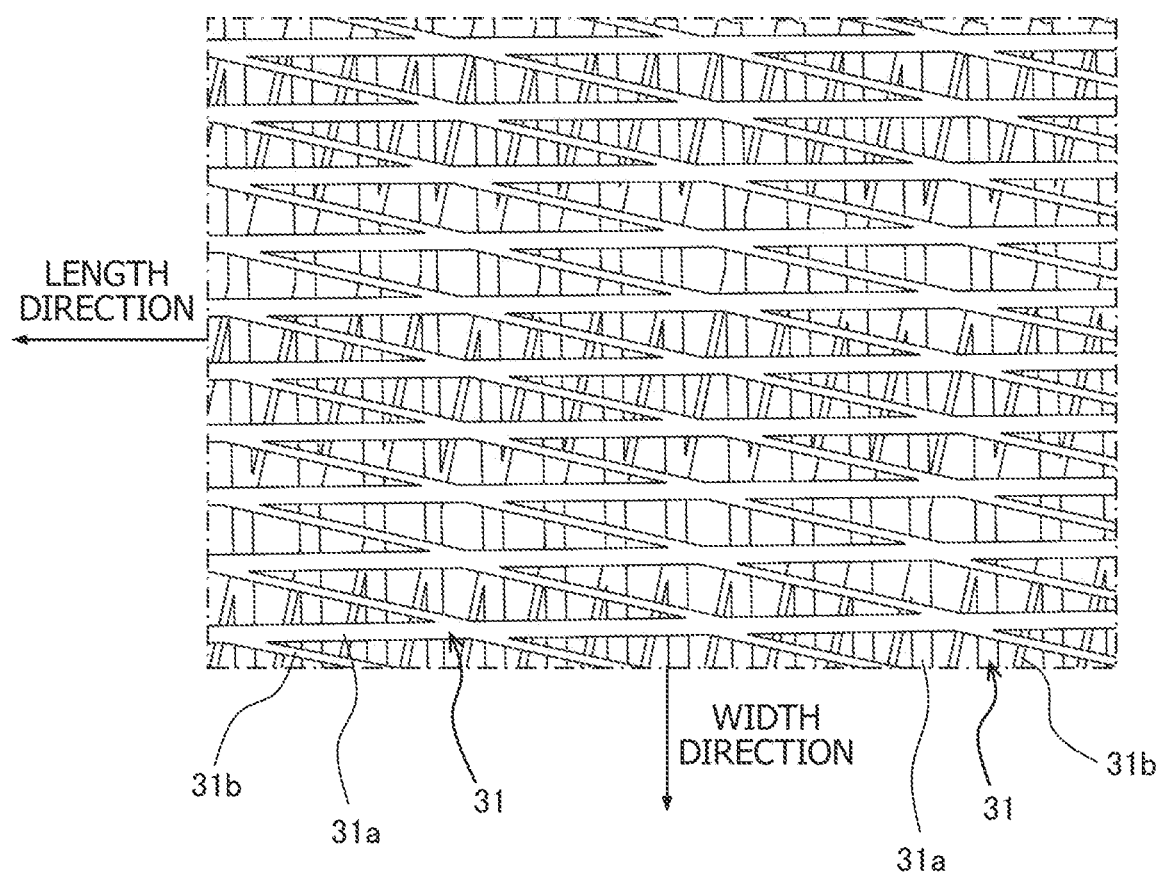
FIG. 5 is a view illustrating another example of the substrate (mesh structure) of the adhesive tape.

As illustrated in FIG. 5, a second mesh structure is a complex nonwoven fabric in which the split web 31 (FIG. 2) and the split web 31 (FIG. 2) are layered and bonded such that their drawing directions are substantially orthogonal to each other. Various characteristics such as a grammage (weight per unit area), sizes (thickness and width) of constituent fibers, tensile strength, and the like, of the second mesh structure can be controlled by appropriately adjusting the thickness of the first thermoplastic resin layer of the multilayer film, the drawing magnification, the splitting portions in the split film 31, and the like. In the second mesh structure, the fiber group constituting one of the split webs 31, or mainly the group of the stem fibers 31a, corresponds to the multiple first fibers, and the fiber group constituting the other split web 31, or mainly the group of the stem fibers 31a, corresponds to the multiple second fibers.

Third Mesh Structure

A third mesh structure is a complex nonwoven fabric in which a first drawn fiber group made of multiple drawn fibers, each of which is drawn in the axial direction, arranged and oriented in the first direction, and a second drawn fiber group made of multiple drawn fibers, each of which is drawn in the axial direction, arranged and oriented in the second direction, are layered and bonded. For example, the drawn fiber may be formed by uniaxially drawing a multilayer tape having the same structure as the multilayer film in the length direction (longitudinal direction). In the third mesh structure, the multiple drawn fibers constituting the first drawn fiber group correspond to the multiple first fibers, and the multiple drawn fibers constituting the second drawn fiber group correspond to the multiple second fibers.

Fourth Mesh Structure

A fourth mesh structure is a woven fabric woven by a freely selected method in a manner such that multiple drawn fibers constituting the first drawn fiber group are used as the warp and multiple drawn fibers constituting the second drawn fiber group are used as the weft, and then, subjected to integration of the first drawn fiber group and the second drawn fiber group by adhesion, or the like. In the fourth mesh structure, the multiple drawn fibers constituting the first drawn fiber group corresponding to the warp correspond to the multiple first fibers, and the multiple drawn fibers constituting the second fiber group corresponding to the weft correspond to the multiple second fibers.

Fifth Mesh Structure

For example, a fifth mesh structure is a complex nonwoven fabric in which the split web 31 (FIG. 2) and a drawn fiber group made of multiple drawn fibers are layered and bonded. For example, the fifth mesh structure may have a two-layered structure in which the split web 31 and the second drawn fiber group are layered and bonded, or a three-layered structure in which the second drawn fiber group is layered and bonded on both sides of the split web 31. In the fifth mesh structure, the fiber group constituting the split web 31, or mainly the group of the stem fibers 31a, corresponds to the multiple first fibers, and the multiple drawn fibers constituting the second drawn fiber group corresponds to the multiple second fibers.

It should be noted that, as described above, the mesh structure only needs to have a structure in which the multiple first fibers drawn in the first direction corresponding to the length direction (longitudinal direction) of the adhesive tape 1 and the multiple second fibers drawn in the second direction corresponding to the width direction (lateral direction) of the adhesive tape 1 are layered or woven, and the mesh structure is not limited to the abovementioned first to fifth mesh structures.

Next, an example of a method for manufacturing an adhesive tape 1 will be briefly described. First, a mesh structure serving as the substrate 2 is prepared. Next, a laminate layer made of, for example, low-density polyethylene (LDPE) is formed on both sides of the mesh structure by extrusion lamination processing. Then, an adhesive layer 3 is formed by, for example, applying an acrylic adhesive on one side of the mesh structure, that is, on the laminate layer. Thereby, the adhesive tape 1 is obtained. If necessary, a release sheet to be peeled off when the adhesive tape 1 is used may be attached to the exposed surface of the acrylic adhesive (adhesive layer 3) and/or a release agent (backside treatment agent) may be coated on the other side of the mesh structure, that is, on the laminate layer.

EXAMPLES

Hereinbelow, the present invention will be specifically described with reference to Examples. The following examples do not limit the present invention at all.

In order to verify ease of cutting, productivity, and workability of the adhesive tape 1, multiple samples of the mesh structure constituting the substrate 2 were prepared, and the respective characteristics indicated in FIGS. 6 and 7 were measured or evaluated.

Examples

Each of Examples 1-4 is a mesh structure (the second mesh structure) in which the split webs 31 and the split webs 31 are layered and bonded such that their drawing directions are substantially orthogonal to each other. In the split web 31, resin A was used for the first thermoplastic resin layer, which is a main layer of the multilayer film, and resin B used as the second thermoplastic resin layer (adhesive layer) was layered on both sides of the first thermoplastic resin layer by a water-cooled blown film extrusion. Then, the split web 31 and the split web 31 were bonded by heat welding to obtain Example 1-4. By appropriately changing the conditions for preparing the split web 31, Examples 1-4 were made into mesh structures having different characteristics.

Comparative Example

In Comparative Example 1, resin C was used in place of resin B in Example 1 as the second thermoplastic resin layer (adhesive layer) of the multilayer film (that is, the second mesh structure). Comparative Example 2 is a mesh structure (the first mesh structure) in which the split web 31 and the slit web 32 are layered and bonded such that there drawing direction are substantially orthogonal to each other. In the split web 31 and the slit web 32, resin A was used for the first thermoplastic resin layer, which is the main layer of the multilayer film, and resin C used as the second thermoplastic resin layer (adhesive layer) was layered on both sides of the first thermoplastic resin layer by the water-cooled blown film extrusion. Then, the split web 31 and the slit web 32 were bonded by heat welding to obtain Comparative Example 2. In Comparative Example 3, resin B was used for the second thermoplastic resin layer (adhesive layer) of the multilayer film in place of resin C in Comparative Example 2 (that is, the first mesh structure). Comparative Example 4 is a mesh structure (that is, the second mesh structure) similar to that of Examples 1-4, and is a mesh structure having different characteristics from those of Examples 1-4 by appropriately changing the conditions for preparing the split web 31. Comparative Example 5 is a commercially available mesh structure, and has a structure similar to that of the fourth mesh structure.

Resins A to C are as follows. Resin B is a linear low-density polyethylene having a long chain branch polymerized using a metallocene catalyst.

Resin A: High density polyethylene HY444 (manufactured by Japan Polyethylene Corporation)

Resin B: Linear low-density polyethylene CB2001 (manufactured by Sumitomo Chemical Co., Ltd.)

Resin C: Low-density polyethylene LE541H (manufactured by Japan Polyethylene Corporation)

Each mesh structure of Examples 1-4 and Comparative Examples 1-5 was measured in terms of thickness, width and single yarn strength of the first fiber (warp), thickness and width of the second fiber (weft), tensile strength in the first direction (longitudinal direction), adhesive force between the multiple first fibers and the multiple second fibers (adhesive force between the split web and the split web, and adhesive strength between the split web and the slit web), and bending resistance in the first direction (longitudinal direction) and the second direction (lateral direction) by the cantilever test.

The tensile strength in the first direction was measured by a tensile tester. Specifically, a specimen (200 mm length×50 mm width) was cut from each mesh structure of Examples 1-4 and Comparative Examples 1-5, and both ends of the obtained specimen were held with holding members with a distance between the held points of 100 mm, and then pulled at a pulling rate of 200 mm/min. The maximum point strength obtained was measured.

The single fiber strength of the first fiber was calculated by dividing the tensile test result of the specimen (200 mm length×50 mm width) of the split web or the slit web by the number of constituent fibers of the specimen, or by dividing the tensile test result of drawn fiber group (including n fibers), corresponding to the specimen, by the number of fibers n.

The adhesive force between the multiple first fibers and the multiple second fibers was measured by using a tensile tester. Specifically, a specimen (200 mm length×150 mm width) was cut from each mesh structure of Examples 1-4 and Comparative Examples 1-5, and then, from above the cut specimen, a U-shaped member connected to a load cell of the tensile tester was made to hook the center of the specimen. The lower part of the specimen was fixed to the tensile tester. The pulling rate was 500 mm/min. The average value of the amplitudes of load indicating values of displacements of 40 mm to 90 mm was used as an adhesive force.

In addition, each mesh structure of Examples 1-4 and Comparative Examples 1-5 was evaluated in terms of formability during extrusion lamination processing, occurrence of wrinkles, and the like. Furthermore, the adhesive layer was formed on each mesh structure of Examples 1-4 and Comparative Examples 1-5 to form an adhesive tape, and each adhesive tape was evaluated in terms of ease of cutting of the adhesive tape (ease of cutting by hand), productivity of the adhesive tape (presence or absence of wrinkles during extrusion lamination), misalignment of fibers occurring during cutting (misalignment), workability during placing process (presence or absence of wrinkles or twists), workability during peeling off process (presence or absence of torn piece, presence or absence of residue that was not peeled off), and the like.

The measurement or evaluation result of each property in Examples 1-4 is indicated in FIG. 6, and the measurement or evaluation result of each property in Comparative Examples 1-5 is indicated in FIG. 7.

In Examples 1-4, satisfactory results were obtained with regard to ease of cutting, productivity, and workability. That is, the ease of cutting (ease of cutting by hand) was good, wrinkles were not produced during extrusion lamination processing, tapes could be easily placed, and no tearing of the tapes occurred and no residue was left when the tapes were peeled off. On the other hand, the residue left when the tape was peeled off in Comparative Example 1, the ease of cutting (ease of cutting by hand) was poor in Comparative Examples 2-4, and wrinkles were produced during extrusion lamination processing in Comparative Example 5, so that formability was poor. That is, in Comparative Examples 1-5, good results were not obtained for at least one of ease of cutting, productivity, and workability.

In view of the above, it is thought that it is possible to obtain an adhesive tape having superior ease of cutting, productivity, and workability by using a mesh structure having characteristics equivalent to those of Examples 1-4 as a substrate of the adhesive tape.

REFERENCE SYMBOL LIST

1 Adhesive tape
2 Substrate (mesh structure)
3 Adhesive layer
31 Split web (uniaxially drawn mesh film)
32 Slit web (uniaxially drawn mesh film)

The invention claimed is:

1. An adhesive tape comprising:
a substrate including a mesh structure made of thermoplastic resin; and
an adhesive layer provided on one side of the substrate,
wherein the mesh structure has a structure in which multiple first fibers drawn in a first direction corresponding to a length direction of the adhesive tape and multiple second fibers drawn in a second direction corresponding to a width direction of the adhesive tape are layered or woven, wherein
(a) a first fiber has a thickness of 0.04 mm or less, and the first fiber has a width of 0.6 mm or less,
(b) a second fiber has a thickness greater than that of the first fiber, and the second fiber has a width greater than or equal to that of the first fiber,
(c) the mesh structure has a tensile strength in the first direction of from 130 to 250 N/50 mm,
(d) the mesh structure has a bending resistance in the first direction obtained by a cantilever test of from 40 to 80 mm,
(e) the mesh structure has a bending resistance in the second direction obtained by the cantilever test of from 65 to 95 mm, and
(f) the multiple first fibers and the multiple second fibers are bonded together by an adhesive force of 40 N or greater.

2. The adhesive tape according to claim 1, wherein the first fiber has a single fiber strength of 5 N or less.

3. The adhesive tape according to claim 1, wherein each of the first and second fibers comprises a first thermoplastic resin layer made of polyolefin resin and a second thermoplastic resin layer made of linear low-density polyethylene, wherein the first fibers and the second fibers are bonded together via the second thermoplastic resin layers functioning as adhesive layers.

4. The adhesive tape according to claim 3, wherein the linear low-density polyethylene is polymerized using a metallocene catalyst.

5. The adhesive tape according to claim 3, wherein the linear low-density polyethylene has a long chain branch in the molecular chain.

6. The adhesive tape according claim 1,
wherein each of the multiple first fibers is a fiber constituting a first uniaxially drawn mesh film uniaxially drawn in the first direction,
wherein each of the multiple second fibers is a fiber constituting a second uniaxially drawn mesh film uniaxially drawn in the second direction, and
wherein the mesh structure is formed by layering the first uniaxially drawn mesh film and the second uniaxially drawn mesh film.

7. A substrate for an adhesive tape comprising a mesh structure made of thermoplastic resin,
wherein the substrate has a structure in which multiple first fibers drawn in a first direction corresponding to a length direction of the adhesive tape and multiple second fibers drawn in a second direction corresponding to a width direction of the adhesive tape are layered or woven, wherein
(a) a first fiber has a thickness of 0.04 mm or less, and the first fiber has a width of 0.6 mm or less,
(b) a second fiber has a thickness greater than that of the first fiber, and the second fiber has a width greater than or equal to that of the first fiber,
(c) the mesh structure has a tensile strength in the first direction of from 130 to 250 N/50 mm,
(d) the mesh structure has a bending resistance in the first direction obtained by a cantilever test of from 40 to 80 mm,
(e) the mesh structure has a bending resistance in the second direction obtained by the cantilever test of from 65 to 95 mm, and
(f) the multiple first fibers and the multiple second fibers are bonded together by an adhesive force of 40 N or greater.

* * * * *